United States Patent
Ito et al.

(10) Patent No.: US 8,016,206 B2
(45) Date of Patent: Sep. 13, 2011

(54) VEHICLE AIR CONDITIONING SYSTEM AND AUTOMOBILE HAVING THE VEHICLE AIR CONDITIONING SYSTEM

(75) Inventors: Norio Ito, Nagoya (JP); Takayoshi Ichihara, Fujisawa (JP)

(73) Assignees: Aichi Machine Industry Co., Ltd., Nagoya-shi, Aichi-ken (JP); Nissan Motor Co., Ltd., Yokohama-shi, Kanagawa-ken (JP)

( * ) Notice: Subject to any disclaimer, the term of this patent is extended or adjusted under 35 U.S.C. 154(b) by 1432 days.

(21) Appl. No.: 11/203,101

(22) Filed: Aug. 15, 2005

(65) Prior Publication Data

US 2006/0043204 A1    Mar. 2, 2006

(30) Foreign Application Priority Data

Aug. 31, 2004  (JP) .................................. 2004-253640

(51) Int. Cl.
- *B01D 19/00* (2006.01)
- *B60H 1/04* (2006.01)
- *F24D 1/00* (2006.01)
- *A61M 5/36* (2006.01)

(52) U.S. Cl. ................. 237/12.3 B; 237/12.1; 237/12.4; 237/56; 95/241; 95/260; 95/262; 96/155; 96/204; 96/206; 96/220; 210/167.01; 210/167.32; 210/180; 210/181; 210/188; 123/41.54

(58) Field of Classification Search .................. 96/155, 96/204, 206, 220, 241, 260, 262; 123/41.54; 95/241, 260, 262; 210/167.01, 167.32, 180, 210/181, 188, 320; 237/12.1, 12.3 B, 12.4, 237/56

See application file for complete search history.

(56) References Cited

U.S. PATENT DOCUMENTS

| | | | |
|---|---|---|---|
| 290,451 A * | 12/1883 | Merrick | 237/12.1 |
| 1,317,966 A * | 10/1919 | Deemer et al. | 165/44 |
| 2,200,620 A * | 5/1940 | Findley | 237/12.3 B |
| 2,266,193 A * | 12/1941 | Grutzner | 237/2 A |
| 3,004,626 A * | 10/1961 | Brinen | 96/204 |
| 3,074,645 A * | 1/1963 | Main | 237/63 |
| 3,273,319 A * | 9/1966 | Jones et al. | 96/204 |
| 3,276,188 A * | 10/1966 | Carlson | 96/212 |
| 3,309,020 A * | 3/1967 | Cobley | 237/8 A |
| 3,345,803 A * | 10/1967 | Smith | 95/260 |

(Continued)

FOREIGN PATENT DOCUMENTS

JP    4-358921    11/1992

*Primary Examiner* — Steven B McAllister
*Assistant Examiner* — Daniel E Namay
(74) *Attorney, Agent, or Firm* — Dennison, Schultz & MacDonald

(57) ABSTRACT

An air conditioning system for automobile having a heater core capable of heating the interior in good efficiency is to be provided. Such a heater core is supplied with the coolant having bubbles removed, and thereby the efficiency of heat exchange is enhanced and the noise is reduced. On the internal combustion engine is mounted a water outlet (bubble separating means) 3 having a receiving chamber 8 that the coolant after cooling the engine flows in. In the downstream position of the chamber 8 is formed a communicating portion 9 of narrowed sectional area and a feeding chamber 10 of increased sectional area in turn. The flowing velocity of the coolant is increased in the communicating portion 9 and decreased in the feeding chamber 10 and thereby it is possible to make bubbles in the coolant float up and separate out. As a result, the coolant without bubbles may be fed to the heater core 7 through a feeding portion 11.

3 Claims, 3 Drawing Sheets

U.S. PATENT DOCUMENTS

| | | | |
|---|---|---|---|
| 3,576,181 A * | 4/1971 | Neal et al. | 123/41.51 |
| 3,778,973 A * | 12/1973 | Martinez | 96/155 |
| 3,885,930 A * | 5/1975 | Scheerer | 261/135 |
| 4,006,775 A * | 2/1977 | Avrea | 165/51 |
| 4,075,984 A * | 2/1978 | Kirchgessner et al. | 123/41.54 |
| 4,098,328 A * | 7/1978 | Cheong | 165/72 |
| 4,102,655 A * | 7/1978 | Jeffery et al. | 96/204 |
| 4,199,332 A * | 4/1980 | Krohn et al. | 96/208 |
| 4,480,598 A * | 11/1984 | Berrigan | 123/41.27 |
| 4,701,191 A * | 10/1987 | Kreuwel et al. | 96/203 |
| 4,708,157 A * | 11/1987 | Sabatino | 137/179 |
| 4,759,499 A * | 7/1988 | Gusinde et al. | 237/12.3 B |
| 4,789,098 A * | 12/1988 | Shepherd et al. | 237/12.3 R |
| 5,016,705 A * | 5/1991 | Bahrle et al. | 165/41 |
| 5,092,282 A * | 3/1992 | Danekas et al. | 123/41.21 |
| 5,490,874 A * | 2/1996 | Kuster et al. | 96/204 |
| 5,660,618 A * | 8/1997 | Park | 96/204 |
| 5,900,045 A * | 5/1999 | Wang et al. | 95/241 |
| 5,938,115 A * | 8/1999 | Aoki et al. | 237/12.3 R |
| 5,985,004 A * | 11/1999 | Boyd | 95/241 |
| 5,989,318 A * | 11/1999 | Schroll | 96/6 |
| 6,416,632 B1 * | 7/2002 | Kirjasniemi et al. | 162/380 |
| 6,811,592 B2 * | 11/2004 | Young et al. | 95/248 |
| 6,893,485 B2 * | 5/2005 | MacDuff | 95/241 |
| 7,131,292 B2 * | 11/2006 | Ikegami et al. | 62/500 |
| 7,261,069 B2 * | 8/2007 | Gunther | 123/41.54 |
| 7,384,451 B2 * | 6/2008 | Shiraishi et al. | 95/19 |
| 2003/0230251 A1 * | 12/2003 | Chang et al. | 123/41.54 |
| 2003/0230252 A1 * | 12/2003 | Lin et al. | 123/41.54 |
| 2006/0137663 A1 * | 6/2006 | Vaught | 123/516 |

* cited by examiner

VEHICLE AIR CONDITIONING SYSTEM AND AUTOMOBILE HAVING THE VEHICLE AIR CONDITIONING SYSTEM

FIELD OF THE INVENTION

The present invention relates to a vehicle air conditioning system having the improved heating performance. The present invention also relates to an automobile having such a vehicle air conditioning system.

BACKGROUND OF THE INVENTION

One known arrangement of the air conditioning system of this type is to perform the interior heating by introducing the high temperature cooling water after cooling the engine into a heater core to transfer the heat from the water to the air of the interior, as disclosed in the following patent document 1, for example. In this system, by means of a high flow type water pump it is possible to feed a sufficient amount of cooling water to a heater core, so that a sufficient quantity of heat for the interior heating can be obtained.
Patent document 1: JP-A-H04-358921

In such a vehicle air conditioning system, however, when the cylinder head and cylinder block are cooled, a part of the cooling water is vaporized and the produced bubbles are transferred to the heater core. As a result, the system has a problem that a drop in efficiency of heat exchange and the noise of interior heating are caused in the heater core.

SUMMARY OF THE INVENTION

The present invention is worked out in view of the above-described problem in the prior art. It is an object of the present invention to provide a vehicle air conditioning system and an automobile having such a vehicle air conditioning system, which provides the improved heating performance and the decreased noise in a heating means.

The foregoing object is accomplished in a vehicle air conditioning system performing the heating of the interior by making use of the cooling water or coolant for cooling the internal combustion engine, comprising a heating means of the interior for radiating the heat included in the coolant after cooling the internal combustion engine and for making use of the radiated heat to heat said interior, and a bubble separating means for removing bubbles included in the coolant and for feeding the coolant without bubbles to the heating means.

Accordingly, in this system, the bubbles contained in the coolant are separated and the coolant without bubble is fed to the heating means, so that the heating performance may be improved by efficiently radiating the heat from the coolant after cooling the internal combustion engine and further the noise may be reduced that is generated when the bubbles flow in the heating means.

In carrying out the invention in one preferred mode, the bubble separating means is one that performs the separation of the bubbles by utilizing the fact that the specific gravity of the bubble is smaller than that of the coolant, so that the bubbles may be separated efficiently.

In another embodied mode of the invention, the bubble separating means is one that performs the separation of the bubbles by utilizing the change of flowing velocity of the coolant. In particular, the bubble separating means is provided with a receiving chamber to receive the coolant after cooling the internal combustion engine and with a feeding chamber to feed the received coolant into the heating means, and makes the flowing velocity of the coolant change by changing the cross sectional area of the passage from the receiving chamber to the feeding chamber. Namely, the bubble separating means is formed so that the cross sectional area of the passage just upstream of the feeding chamber may be smaller than that of the feeding chamber. Alternatively, the bubble separating means is formed so that the receiving chamber may be adjacent to the feeding chamber.

Accordingly, when the coolant flows from the receiving chamber to the feeding chamber, due to the change of the flowing velocity of the coolant, or due to the lowering of the flowing velocity of the coolant, the bubbles are liable to float upward. As a result, the bubbles may be separated efficiently by means of a simple structure.

In a further embodied mode of the invention, the bubble separating means is constructed so that the top of the feeding chamber may be arranged above that of the receiving chamber and the bottom of the feeding chamber may be below that of the receiving chamber, and so that a feeding portion for feeding the coolant into the heating means may be formed on the lower part of the feeding chamber below the lower end of the receiving chamber. Accordingly, the bubbles may be surely separated to feed only the coolant without bubble into the heating means.

In a still further embodied mode of the invention, a vehicle air conditioning system further comprises a bubble removing means for removing the bubbles. The bubble separating means is constructed so that the top of the feeding chamber may be arranged above the upper end of the receiving chamber and provided with an introducing portion for introducing the bubbles into the bubble removing means. Accordingly, the separated bubbles may be well removed by the bubble removing means.

In a still further embodied mode of the invention, an automobile has the vehicle air conditioning system in various embodied modes described above.

Other advantageous features of the invention will be obvious after a reading of the following detailed description of the preferred embodiment shown in the drawings as follows.

DESCRIPTION OF THE PREFERRED EMBODIMENT

Hereinafter, an embodiment of an air conditioning system of an automobile will be described with reference to the drawings.

Figure 1:
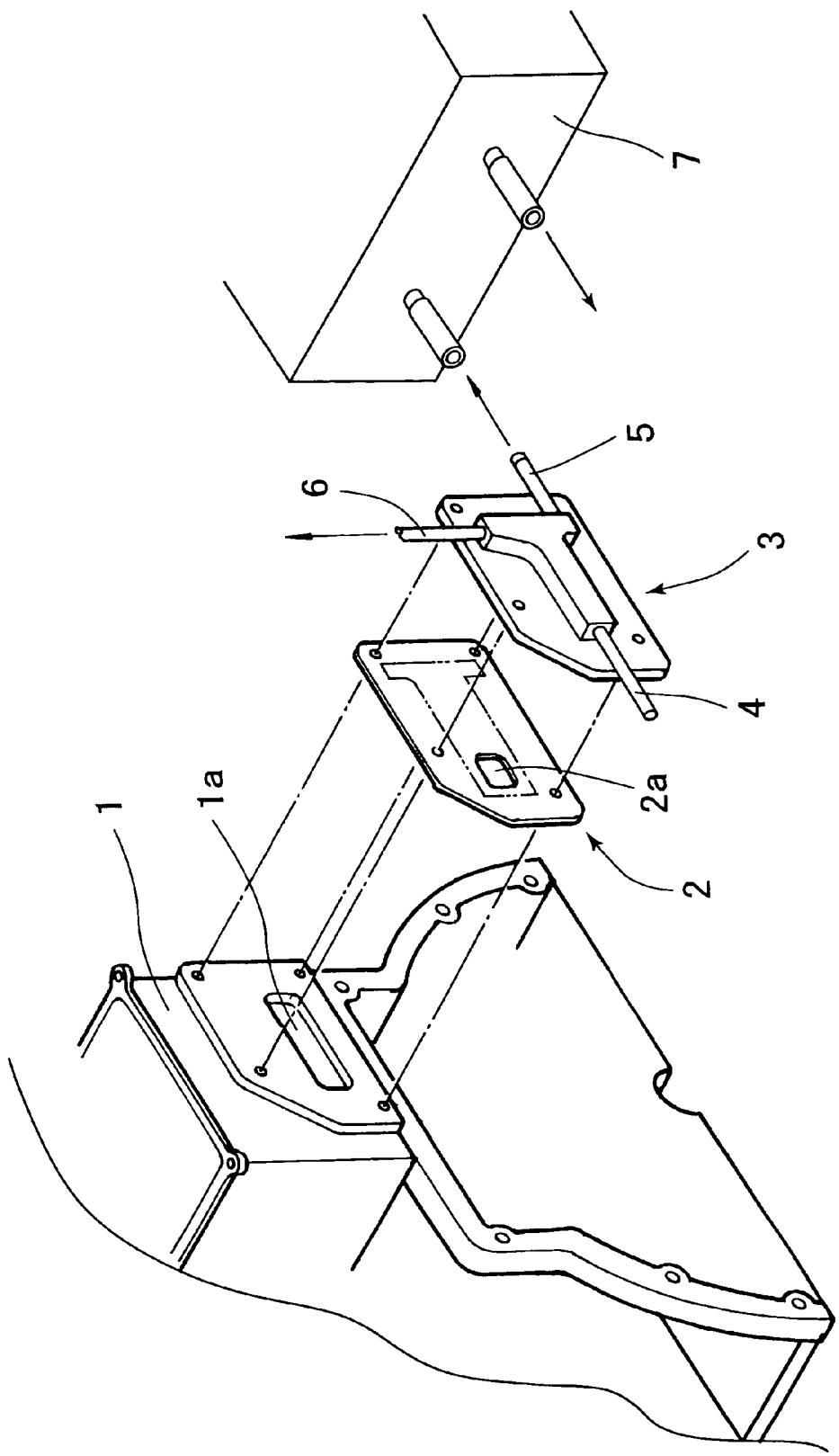
FIG. 1 is an exploded diagrammatic perspective view of a water outlet to be mounted on a cylinder head, as a first embodiment according to the present invention.

Referring to FIG. 1, in the side surface of a cylinder head 1 is provided a coolant outlet 1a, to which it is possible to mount a water outlet (bubble separating means) 3 through a gasket 2. This water outlet 3 is provided with a radiator connector 4 for feeding coolant to a radiator (not shown), and with a heater connector 5 for feeding coolant to a heater core 7, and further with a throttle chamber connector 6 for feeding coolant to a throttle chamber (not shown).

Figure 2:
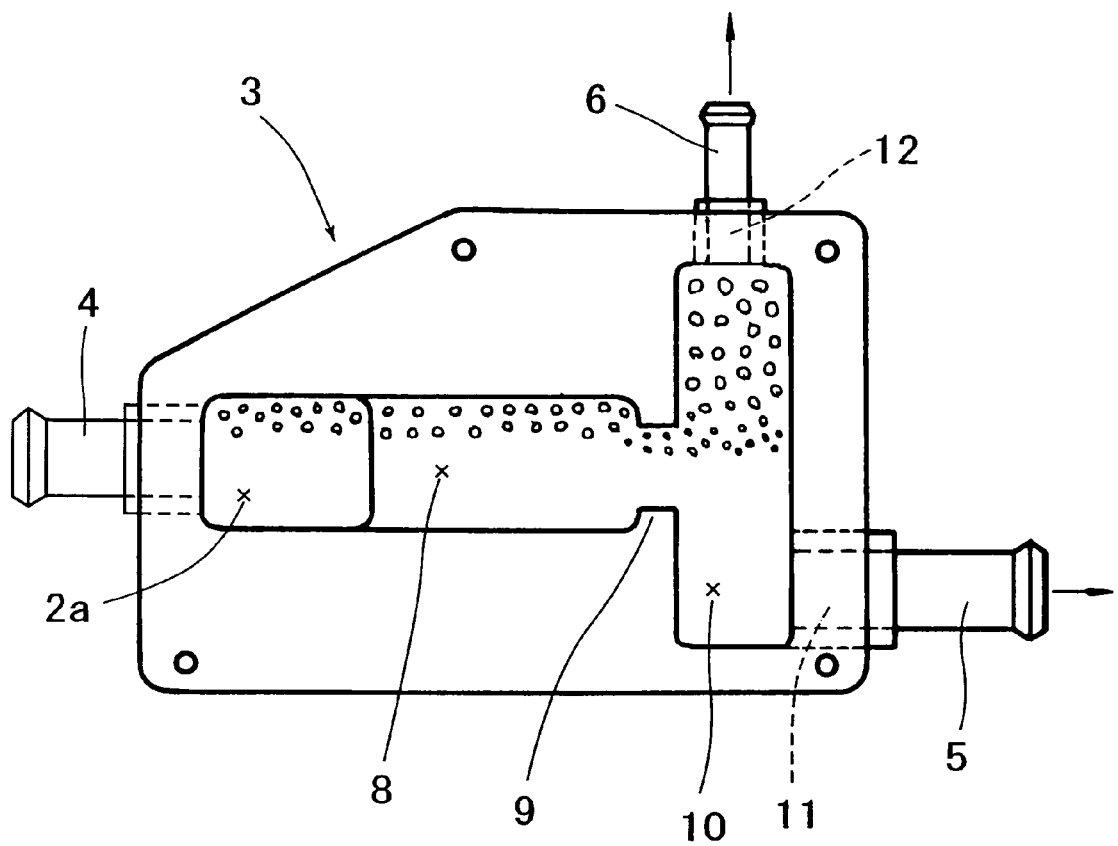
FIG. 2 is a diagrammatic front view of the water outlet toward the cylinder head.

Referring to FIG. 2, inside the water outlet 3 is formed a receiving chamber 8 extending laterally from the position aligned with the outlet 1a (FIG. 1) and with an inlet 2a opened in the gasket 2. In the right end (as illustrated) of this receiving chamber 8 is formed a communicating portion 9 with a smaller cross section than that of the chamber 8. Further in the right end (as illustrated) of this communicating portion 9 is formed a feeding chamber 10 with a larger cross section than that of the receiving chamber 8.

The top of this feeding chamber 10 is positioned above the top of the receiving chamber 8 and inversely the bottom of this feeding chamber 10 is positioned below the bottom of the chamber 8. The bottom part of the feeding chamber 10 is provided with a feeding portion 11 opening upon the right (as illustrated), to which is connected the heater connector 5. Also, on the top of the feeding chamber 10 is formed an introducing portion 12, to which is connected the throttle chamber connector 6 so as to communicate with the portion 12.

In such a construction, the coolant, after cooling the cylinder head 1 and cylinder block of the internal combustion engine, flows from the coolant outlet 1a through the inlet 2a of the gasket 2 into the receiving chamber 8 of the water outlet 3. A part of the coolant in the receiving chamber 8 is fed from the radiator connector 4 into the radiator (not shown). The radiator (not shown) is provided with a cap, out of which may be well released the bubbles.

When another part of the coolant in the receiving chamber 8 passes through the communicating portion 9, the velocity of the flowing fluid becomes larger due to the narrow cross section, while the bubbles in the coolant grows to larger ones. Further, when the coolant flows into the downstream feeding chamber 10 with a larger cross section, it makes a rapid lowering of the flowing velocity, so that the enlarged bubbles are liable to float up. Namely, the bubbles in the coolant may be separated by utilizing the difference in specific gravity between the coolant and the bubbles and by utilizing the change of the flowing velocity.

Alternatively, even if the water outlet 3 has such a construction that no communicating portion 9 exists and the receiving chamber 8 is adjacent to the feeding chamber 10, it is possible to lower the velocity of the coolant when the coolant flows from the receiving chamber 8 to the feeding chamber 10. Accordingly, the bubbles in the coolant are liable to float up, so that it becomes possible to separate the bubbles efficiently.

The bubbles, which floated up to the top of the feeding chamber 10, flow through the introducing portion 12 and the throttle chamber connector 6 and are introduced into the throttle chamber and the radiator (both not shown). Out of the radiator cap the bubbles are released and well removed. Namely, the radiator cap constructs a bubble removing means.

On the other hand, the coolant, which flows from the lower part of the feeding chamber 10 into the feeding portion 11, has the bubbles well removed. The coolant without bubbles flows through the heater connector 5 into the heater core 7, where heat exchange is carried out efficiently to heat the interior of a vehicle air conditioning system. Since the bubbles have been removed, in the heater core 7 the efficiency of heat exchange is prevented from lowering and the generation of noise is well reduced.

As described above, in this embodiment of the invention, even if a part of the coolant is vaporized to generate bubbles in the coolant while cooling the cylinder head 1 and cylinder block, the bubbles may be well removed in the water outlet (bubble separating means) 3, so that it is possible to make the coolant flowing into the heater core 7 contain no bubble. As a result, the efficiency of heat exchange may be improved in the heater core (interior heating means), and the generation of noise may be reduced, and further sufficient quantity of heat may be obtained for heating in the heater core 7.

Figure 3:
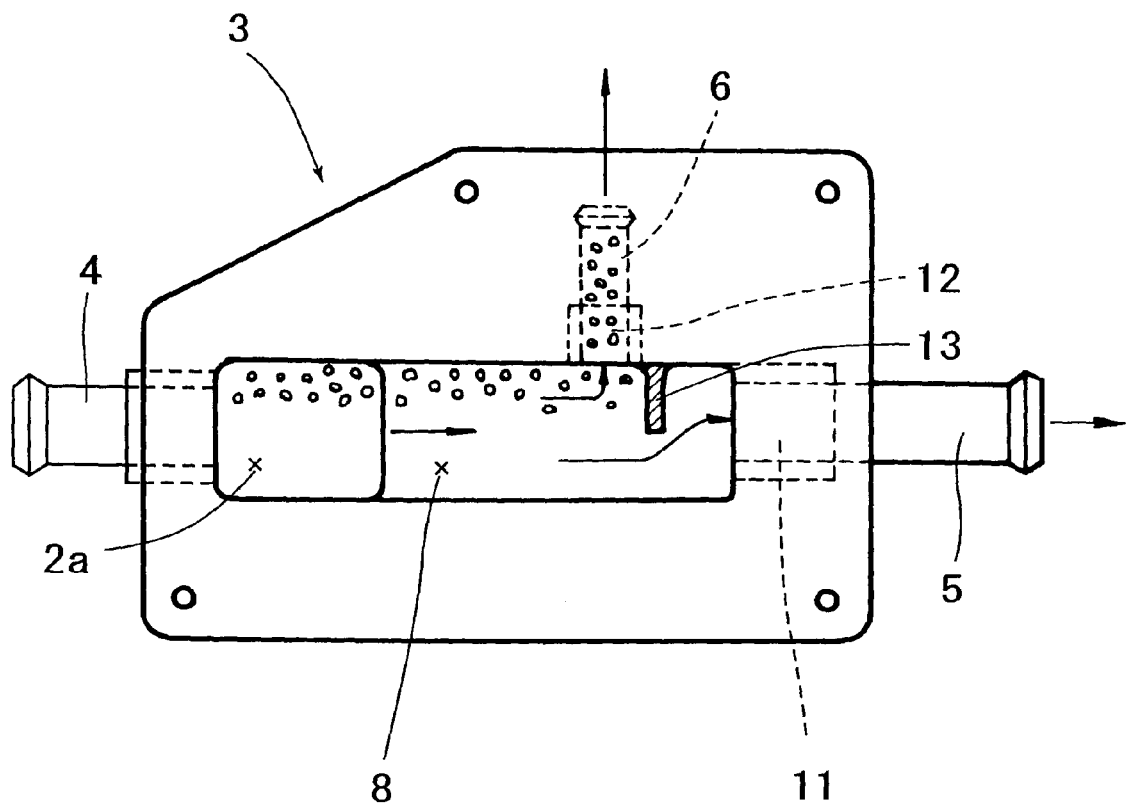
FIG. 3 is a diagrammatic front view of a water outlet toward a cylinder head, as another embodiment of the present invention.

Next, referring to FIG. 3, there is shown a water outlet 3 as an alternative embodiment according to the present invention. In the same way as the first embodiment, inside the water outlet 3 is formed a receiving chamber 8 extending laterally. On the right side (as illustrated) of this receiving chamber 8 is provided an introducing portion 12 extending upward and communicating with a throttle chamber connector 6. Within the receiving chamber 8 and on the downstream side of this introducing portion 12, a vertical partition 13 is formed to extend downward from the top wall of the chamber 8. On the downstream side of this vertical partition 13, a feeding portion 11 to which is connected a heater connector 5 is provided.

In this embodiment, the coolant containing bubbles flows from the cylinder head 1 into the receiving chamber 8 and collides with the vertical partition 13. Then, the bubbles in the coolant float up through the introducing portion 12 into the throttle chamber connector 6 to be separated. Namely, since the vertical partition 13 is formed as shown in FIG. 3, the bubbles in the coolant may be separated efficiently by utilizing the difference of specific gravity between the coolant and the bubble.

Also in such a construction as the alternative embodiment, the bubbles are well removed from the coolant that is fed from the heater connector 5 into the heater core 7. Accordingly, the efficiency of heat exchange is improved in the heater core 7 and also the generation of noise is reduced, so that the interior of a vehicle air conditioning system may be heated efficiently.

Having described the invention in detail and by reference to the preferred embodiment thereof, it will be apparent that other modifications and variations are possible without departing from the scope of the invention defined in the appended claims.

What is claimed is:

1. An automobile having an interior in which heating of the interior is performed by making use of a coolant for cooling an internal combustion engine, comprising:
  a heating means of the interior for radiating heat absorbed by said coolant after cooling said internal combustion engine and for making use of the radiated heat to heat said interior; and
  a bubble separating means for removing bubbles included in said coolant and for feeding the coolant without bubbles to said heating means,
  wherein said bubble separating means comprises a receiving chamber to receive the coolant after cooling the internal combustion engine, the receiving chamber being constructed and arranged for substantially horizontal flow of coolant along a length thereof and comprising an inlet centrally disposed along the length, a first outlet at a first end thereof and connected to a radiator of the automobile, and a second outlet at an opposite end thereof, a feeding chamber to feed the received coolant into the heating means, and a communication portion opened at the second end of the receiving chamber positioned on a downstream side in a main direction of flow of the coolant through the receiving chamber, the communication portion communicating between the second end of the receiving chamber and the feeding chamber, the communication portion having a cross-sectional area which is smaller than a cross-sectional area of the receiving chamber and the feeding chamber,
  the receiving chamber and the communication portion being arranged such that the coolant flows substantially horizontally into the receiving chamber from the inlet and flows substantially horizontally through the receiving chamber along the longitudinal direction to the communication portion before flowing to the feeding chamber.

2. An automobile as defined in claim 1, wherein said bubble separating means is constructed so that a top of said feeding chamber is positioned above a top of said receiving chamber and a bottom of said feeding chamber is positioned below a bottom of said receiving chamber, and so that a feeding portion for feeding said coolant into said heating means is formed on a lower part of said feeding chamber below a lower end of said receiving chamber.

3. An automobile as defined in claim 2, further comprising a bubble removing means for removing said bubbles; wherein said bubble separating means is constructed so that the top of said feeding chamber is positioned above the upper end of said receiving chamber and provided with an introducing portion for introducing said bubbles into said bubble removing means.

* * * * *